Patented Jan. 14, 1930

1,743,865

UNITED STATES PATENT OFFICE

FREDERICK J. PILGRIM, OF DETROIT, MICHIGAN

CLEANING AND POLISHING COMPOUND

No Drawing.  Application filed September 23, 1926. Serial No. 137,386.

The primary object of my invention is to provide an efficient metal cleaner and polisher that may be advantageously used for thoroughly cleaning nickel, nickel plated ware and other metallic surfaces.

Another object of this invention is to provide a cleaner and polisher that is not injurious to the user, may be applied by an impregnated cloth, may be used without any special preparation, and will not deteriorate under ordinary conditions.

The cleaning and polishing compound comprises a mixture of quicklime, kerosene, stearic acid and tallow, and the following preparations of these ingredients have been found to give excellent results.

To produce approximately 160 pounds of the compound I obtain approximately 80 pounds of quicklime. This quicklime is ordinarily lumpy or coarse and unslacked. I grind it to a powder and run it through a fine sieve so as to remove all grit with the result that I have a fine smooth quicklime powder.

Next approximately 40 pounds of kerosene is placed in a suitable mixing machine which may be driven by power or manually operated.

Then about 20 pounds of tallow is heated to the melting point, and together with about 20 pounds of stearic acid is added to the kerosene within the mixing machine. These three ingredients, melted tallow, stearic acid, and kerosene are thoroughly mixed, and then approximately 20 pounds of the quicklime powder, previously prepared, is added to the mixture. After this quicklime has thoroughly commingled with the mixture, the remaining quick lime powder is added and the whole batch thoroughly agitated so as to insure a thorough distribution of all of the ingredients.

The mixture within the machine is semi-liquid and is run off into suitable containers, in which it somewhat solidifies and takes the form of a paste.

The paste-like compound has for its principal ingredient quicklime, and the remaining ingredients are employed as a body or vehicle for carrying the quicklime in such form that it may readily attack a metallic surface, and yet be harmless to the hands of a user.

A rag may be passed over the compound to obtain sufficient compound for the application to the surface to be cleaned and polished, and in practice I find that a very small quantity of the compound removes all stains, dirt and foreign matter from the surface to be cleaned and polished. A few strokes of the impregnated rag is sufficient to obtain action on the surface, and then a clean rag may be used for removing any of the compound on the surface and polishing the same.

I attach considerable importance to the quicklime ingredient which is approximately 62 percent calcium oxide, and 38 percent magnesium oxide, the quicklime being comparatively high in magnesia, and since the same is in a very fine powdered condition, with all grit removed, there is nothing whatsoever in my cleaner or polisher that will scratch, mar or otherwise injure a highly finished metallic surface, for instance, the metallic trimmings or fixtures of an automobile for which my compound has been especially provided for removing water stains and the like.

Obviously the proportions of the above ingredients may be varied, also the manner of mixing the compound.

What I claim is:—

A metal cleaning and polishing compound consisting of the following ingredients in approximately the following proportions by weight: 80 parts of quicklime high in magnesia, 40 parts of kerosene, 20 parts of stearic acid and 20 parts of tallow.

In testimony whereof I affix my signature.

FREDERICK J. PILGRIM.